United States Patent
Kaussen et al.

(10) Patent No.: US 12,529,125 B2
(45) Date of Patent: *Jan. 20, 2026

(54) METHOD FOR THE PYROMETALLURGICAL SMELTING OF METAL-CONTAINING RAW MATERIALS, WASTE MATERIALS AND/OR SECONDARY WASTE MATERIALS

(71) Applicant: SMS group GmbH, Düsseldorf (DE)

(72) Inventors: Frank Marlin Kaussen, Aachen (DE); Nikolaus Peter Kurt Borowski, Düsseldorf (DE); Markus Andreas Reuter, Düsseldorf (DE); Stephan Geimer, Mühlheim (DE); Timm Lux, Meerbusch (DE); Rolf Degel, Ratingen (DE)

(73) Assignee: SMS group GmbH, Düsseldorf (DE)

( * ) Notice: Subject to any disclaimer, the term of this patent is extended or adjusted under 35 U.S.C. 154(b) by 364 days.

This patent is subject to a terminal disclaimer.

(21) Appl. No.: 18/039,427

(22) PCT Filed: Nov. 30, 2021

(86) PCT No.: PCT/EP2021/083636
§ 371 (c)(1),
(2) Date: May 30, 2023

(87) PCT Pub. No.: WO2022/117585
PCT Pub. Date: Jun. 9, 2022

(65) Prior Publication Data
US 2024/0002975 A1   Jan. 4, 2024

(30) Foreign Application Priority Data
Dec. 1, 2020 (DE) ............... 10 2020 215 147.4

(51) Int. Cl.
*C22B 5/12* (2006.01)

(52) U.S. Cl.
CPC ..................... *C22B 5/12* (2013.01)

(58) Field of Classification Search
None
See application file for complete search history.

(56) References Cited

U.S. PATENT DOCUMENTS

| | | | |
|---|---|---|---|
| 4,827,486 A | 5/1989 | Brotzmann et al. | |
| 5,227,118 A | 7/1993 | Bleser et al. | |

(Continued)

FOREIGN PATENT DOCUMENTS

| | | |
|---|---|---|
| CA | 1320526 C | 7/1993 |
| CN | 1099805 A | 3/1995 |

(Continued)

OTHER PUBLICATIONS

International Preliminary Report on Patentability for PCT/EP2021/083636, Mar. 1, 2023, WIPO, pp. 1-5 (Year: 2023).*

(Continued)

*Primary Examiner* — Seth Dumbris
(74) *Attorney, Agent, or Firm* — Smartpat PLC

(57) ABSTRACT

The present disclosure relates to a method for the pyrometallurgical smelting of metal-containing raw materials, waste materials and/or secondary waste materials (M), wherein these are fed in shredded form to a smelting unit (1) which includes a smelting zone (6), a main reaction zone (7) and a secondary reaction zone (8) and are smelted in the presence of an oxidizing, reducing and/or inert gas and/or gas mixture (G), such that a liquid melt phase (9), a liquid slag phase (10) and a gas phase are formed. The oxidizing, reducing and/or inert gas and/or gas mixture (G) is supplied in compressed form via at least one injector (11) and is expanded adiabatically within the smelting unit (1) and is then injected as adiabatically expanded gas and/or gas mixture into the liquid slag phase (10).

12 Claims, 1 Drawing Sheet

(56) References Cited

U.S. PATENT DOCUMENTS

| | | | |
|---|---|---|---|
| 5,251,879 | A | 10/1993 | Floyd |
| 5,308,043 | A | 5/1994 | Floyd et al. |
| 5,329,545 | A | 7/1994 | Dudill et al. |
| 5,698,010 | A * | 12/1997 | Ariyama ............... C21C 5/562 75/573 |
| 5,788,921 | A | 8/1998 | Gitman et al. |
| 5,802,097 | A | 9/1998 | Gensini et al. |
| 6,125,133 | A | 9/2000 | Mathur et al. |
| 6,558,614 | B1 | 5/2003 | Fritz |
| 6,805,724 | B2 | 10/2004 | Shver |
| 2001/0043639 | A1 * | 11/2001 | Shver ............... C21C 5/5217 373/85 |
| 2001/0052200 | A1 | 12/2001 | Londero et al. |
| 2003/0000338 | A1 | 1/2003 | Shver |
| 2004/0123784 | A1 | 7/2004 | Satchell |
| 2005/0040571 | A1 | 2/2005 | Matthias et al. |
| 2008/0000325 | A1 | 1/2008 | Mahoney et al. |
| 2009/0166937 | A1 | 7/2009 | Hayton et al. |
| 2011/0011211 | A1 * | 1/2011 | Orth ............... C21B 7/002 95/271 |
| 2013/0106034 | A1 | 5/2013 | Odenthal et al. |
| 2013/0119168 | A1 | 5/2013 | Odenthal et al. |
| 2014/0298955 | A1 | 10/2014 | Okuyama et al. |
| 2014/0327192 | A1 | 11/2014 | Grygorov et al. |
| 2018/0274058 | A1 | 9/2018 | Filzwieser et al. |
| 2019/0218631 | A1 | 7/2019 | Buragino et al. |

FOREIGN PATENT DOCUMENTS

| | | |
|---|---|---|
| CN | 1121358 A | 4/1996 |
| CN | 104894389 A | 9/2015 |
| CN | 104894390 A | 9/2015 |
| CN | 104928493 A | 9/2015 |
| CN | 105039740 A | 11/2015 |
| CN | 116568830 A | 8/2023 |
| DE | 19637246 A1 | 2/1998 |
| DE | 69526422 | 5/2002 |
| DE | 102010001669 A1 | 8/2011 |
| DE | 102011002616 A1 | 12/2011 |
| DE | 102013226109 A1 | 1/2015 |
| EP | 0053594 A1 | 6/1982 |
| EP | 0053595 B1 | 9/1985 |
| EP | 0547447 A1 | 6/1993 |
| EP | 0964065 A1 | 12/1999 |
| EP | 0723129 B1 | 4/2002 |
| EP | 1466022 B1 | 7/2003 |
| EP | 1435484 A2 | 7/2004 |
| EP | 1641946 A1 | 1/2005 |
| EP | 2553127 B1 | 4/2014 |
| JP | H06220518 A | 8/1994 |
| JP | H10259413 A | 9/1998 |
| JP | H11158530 A | 6/1999 |
| JP | H11181514 A | 7/1999 |
| JP | 2003277820 A | 10/2003 |
| JP | 2018131675 A | 8/2018 |
| JP | 2018131676 A | 8/2018 |
| TW | 201326408 A | 7/2013 |
| WO | 9105214 A1 | 4/1991 |
| WO | 2009081282 A2 | 7/2009 |
| WO | 2017001306 A1 | 1/2017 |
| WO | 2019158479 A1 | 8/2019 |

OTHER PUBLICATIONS

Chibwe, D. K., G. Akdogan, G. A. Bezuidenhout, J. P. T. Kapusta, S. Bradshaw, and J. J. Eksteen. "Sonic injection into a PGM Peirce-Smith converter: CFD modelling and industrial trials." Journal of the Southern African Institute of Mining and Metallurgy 115, No. 5 (2015): 349-354.

Frank Marlin Kaussen et al., Method and smelting unit for pyrometallurgical smelting of metal-containing raw materials, waste materials and/or secondary waste materials, co-pending U.S. Appl. No. 18/039,394, national phase entry of PCT/EP2021/083555.

Hans-Jürgen Odenthal et al., Method for treating molten metals and/or slags in metallurgical baths and metallurgical plant for treating molten metals, co-pending U.S. Appl. No. 18/037,991, national phase entry of PCT/EP2021/074560.

Kapusta, Joel PT. "Submerged gas jet penetration: a study of bubbling versus jetting and side versus bottom blowing in copper bath smelting." JOM 69, No. 6 (2017): 970-979.

Kapusta, Joel PT. "Twenty Five Years of Sonic Injection Plant Trials and Implementation—Let's Take Stock." Canadian Institute of Mining, Metallurgy and Petroleum, Jan. 1, 2019.

* cited by examiner

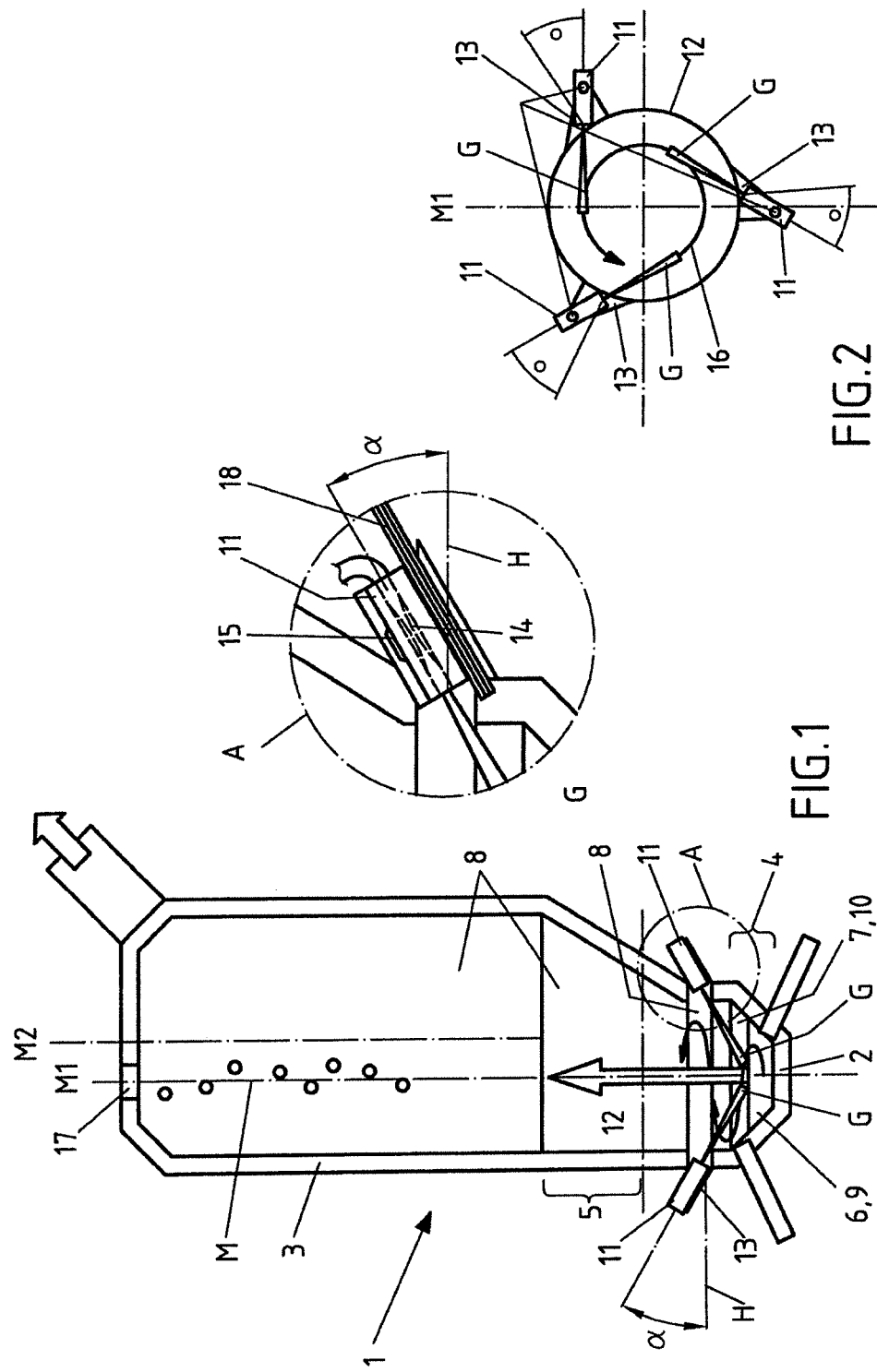

METHOD FOR THE PYROMETALLURGICAL SMELTING OF METAL-CONTAINING RAW MATERIALS, WASTE MATERIALS AND/OR SECONDARY WASTE MATERIALS

CROSS-REFERENCE TO RELATED APPLICATION

This application is a national stage application, filed under 35 U.S.C. § 371, of International Patent Application PCT/EP2021/083636, filed on Nov. 30, 2021, which claims the benefit of German Patent Application DE 10 2020 215 147.4, filed on Dec. 1, 2020.

TECHNICAL FIELD

The present disclosure relates to a method for the pyrometallurgical smelting of metal-containing raw materials, waste materials and/or secondary waste materials in the presence of an oxidizing, reducing and/or inert gas.

BACKGROUND

In principle, methods for pyrometallurgical smelting of metal-containing raw materials, waste materials and/or secondary waste materials are known from the prior art.

The metal-containing raw materials, waste materials and/or secondary waste materials used herein usually have a noticeable proportion of hydrocarbons which, due to the high energy content, requires intensive cooling of the smelting process.

In order to cool the highly exothermic processes, smelting units with coolable reactor walls are known in the prior art. Thus, for example, Chinese patent application CN 104928493 A discloses a method for recovering metals from secondary materials by means of a smelting reactor. This has a circular chamber that is bounded by a coolable reactor wall. A plurality of oxygen lances are arranged in the reactor wall below a slag opening, at an angle of 5°60° to the horizontal and with an offset to the center of the chamber, such that the oxygen can be injected directly into the melt and the melt can be made to rotate within the circular chamber.

However, the external cooling measures known from the prior art are difficult to control due to a noticeable hysteresis and are technically highly complex.

SUMMARY

The present disclosure is based on the object of providing a method that enables better regulation of highly exothermic processes during pyrometallurgical melting of metal-containing raw materials, waste materials and/or secondary waste materials in the presence of an oxidizing, reducing and/or inert gas.

The object is achieved by a method as disclosed and claimed.

In accordance with the method for pyrometallurgical smelting of metal-containing raw materials, waste materials and/or secondary waste materials, these are fed in shredded form to a smelting unit, which comprises a smelting zone, a main- and a secondary reaction zone and are smelted in the presence of an oxidizing, reducing and/or inert gas and/or gas mixture, such that a liquid melt phase, a liquid slag phase and a gas phase are formed.

The method is characterized by the fact that the oxidizing, reducing and/or inert gas and/or gas mixture are fed in compressed form via at least one injector and are adiabatically expanded within the smelting unit and are then injected as adiabatically expanded gas and/or gas mixture into the liquid slag phase, preferably in such a manner that a cooling effect of at least 10 J/Nm$^3$ is achieved.

The adiabatic expansion of the oxidizing, reducing and/or inert gas and/or gas mixture or reaction gas results in a direct cooling effect inside the smelting unit, which allows the energy/heat balance of the process to be controlled in a targeted manner. Thus, by adjusting the pressure, the flow and/or the nozzle geometry of the injector, which preferably comprises a Laval nozzle, the adiabatic expansion of the reaction gas can be adjusted such that a cooling effect of at least 10 J/Nm$^3$, more preferably a cooling effect of at least 100 J/Nm$^3$, still more preferably a cooling effect of at least 1.0 kJ/Nm$^3$, and most preferably a cooling effect of at least 5.0 kJ/Nm$^3$ is achievable.

With regard to the power values, it is pointed out that this is a power specification that is based on a standard cubic meter (Nm$^3$) in accordance with DIN1343:1990-01.

In principle, the maximum value of the achievable cooling effect is physically limited by the Joule-Thompson effect. Therefore, by adjusting the pressure, the flow and/or the nozzle geometry of the injector, which preferably comprises the Laval nozzle, the adiabatic expansion of the reaction gas can be adjusted in such a manner that a cooling effect of a maximum of 100 KJ/Nm$^3$, more preferably a cooling effect of a maximum of 90 kJ/Nm$^3$, even more preferably a cooling effect of a maximum of 80 kJ/Nm$^3$, and most preferably a cooling effect of a maximum of 70 kJ/Nm$^3$ is achievable.

It should be noted that the cooling effect specified here can only be achieved with gases and/or gas mixtures that have a positive Joule-Thompson coefficient μ.

By direct cooling inside the smelting unit by means of the reaction gas, which is thus also used as a cooling medium, the external cooling measures usually carried out by using cooling panels and/or cooling channels may advantageously be augmented, which significantly simplifies and improves the overall cooling management. Furthermore, direct cooling can extend the service life of the refractory lining of the smelting units, which has a beneficial effect on the operating economics of the smelting units.

Advantageous embodiments of the invention are indicated in the claims. The features listed individually in the dependent formulated claims can be combined with one another in a technologically useful manner and may define further embodiments of the invention. In addition, the features indicated in the claims are further specified and explained in the description, wherein further preferred embodiments of the invention are illustrated.

In principle, the reaction gas injected via the at least one injector can be added directly to the liquid slag phase by immersing the injector in the liquid melt phase.

However, it is preferably provided that the reaction gas is blown into the liquid slag phase via at least one injector arranged in the smelting unit above the liquid slag phase and without contact with it and at an angle of 5° to 85°, more preferably at an angle of 15° to 80°, still more preferably at an angle of 25° to 75°, and most preferably at an angle of 35° to 70°, with respect to the horizontal, such that the reaction gas is adiabatically expanded within a main and/or secondary reaction zone of the smelting unit.

Such a reaction gas injection causes the liquid slag phase to become highly turbulent, such that it splashes into the gas phase located above the liquid molten phase and in the secondary reaction zone. Surprisingly, it has thereby been shown that this results in a surface area that is at least a factor of 5, preferably at least a factor of 6, more preferably at least a factor of 7, and most preferably at least a factor of 8 larger than that of the liquid melt phase in the process, which leads to particularly intensive contact along with an increased mass and energy transfer with the gas phase arranged above the liquid melt phase and located in the secondary reaction zone. By arranging the at least one injector at a specific angle to the horizontal, the liquid slag phase is also set in rotation, such that a vortex is formed within the main along with the secondary reaction zone, which additionally supports the turbulence. In this manner, a maximum turbulent environment can be created within the smelting unit, which ensures a particularly effective metallurgical reaction. By the adiabatic expansion of the reaction gas within the liquid slack phase the formation of the large specific surface can be further increased, which ultimately leads to the particularly intensive contact with the surrounding gas atmosphere and increases the chemical reactions along with their degree of conversion.

In the context of the present disclosure, the term "without contact" is understood to mean that the at least one injector, via which the oxidizing, reducing and/or inert gas and/or gas mixture can be blown into the smelting unit, both during blowing in and in the process steps in between, is not in continuous contact with the liquid slag phase, but is positioned at a specific distance therefrom and thus above the bath level throughout the entire process. This is with the exception of temporary contact of individual drops of the liquid slag phase and/or the liquid melt phase, which can occur during the process as a function of the strong turbulence and thus cannot be prevented.

In the context of the present disclosure, unless otherwise defined, the term "injector" means a lance or injection tube formed substantially of a hollow cylindrical element.

In the context of the present disclosure, the term "smelting unit" is understood to mean a conventional bath smelting unit, which comprises a hollow cylinder, hollow cone or hollow cuboid standing on a round or angular base surface, wherein the height of the hollow cylinder, hollow cone or hollow cuboid is a multiple of its length and width. Preferably, therefore, the main reaction zone of the smelting unit arranged above the smelting zone has a substantially circular and/or oval-shaped cross-section.

Other smelting units known to those skilled in the art from the prior art, such as electric arc furnaces (EAF), submerged arc furnaces (SAF) or induction furnaces (IF) are not included in the present invention.

Advantageously, it is provided that the at least one injector, via which the reaction gas is blown into the liquid slag phase without contact, has a minimum distance of 0.10 m, preferably a minimum distance of 0.15 m, more preferably a minimum distance of 0.20 m, still more preferably a minimum distance of 0.25 m, and most preferably a minimum distance of 0.30 m from the surface of the liquid slag phase, with respect to the injector tip. In addition to the agitating effect already explained and the turbulent mixing of the liquid slag phase with the adjacent gas phase, which leads to a particularly effective metallurgical reaction, the arrangement at a distance from the liquid slag phase also results in a significant reduction in wear of the injector. This also effectively prevents clogging of the injector, which requires a very high and cost-intensive maintenance effort with the solutions known from the prior art.

However, the at least one injector via which the reaction gas is blown into the liquid slag phase without contact should not exceed a maximum distance from the surface of the liquid slag phase. Therefore, it is advantageously provided that the at least one injector has a maximum distance of 2.50 m, preferably a maximum distance of 2.0 m, more preferably a maximum distance of 1.50 m, even more preferably a maximum distance of 1.0 m, and most preferably a maximum distance of 0.80 m to the surface of the liquid slag phase, with respect to the injector tip.

In this connection, it is noted that the bath level of the liquid slag phase does not have a static bath level or slag level throughout the process; rather, this can vary due to the different process phases. Therefore, it is advantageously provided that the at least one injector, by which the reaction gas is blown into the liquid slack phase without contact, is positioned within the smelting unit such that a distance in the range between 0.30 m and 2.0 m, particularly preferably a distance in the rage of 0.5 m to 1.70 m to the surface of the liquid slag phase is ensured.

Preferably, the reaction gas is blown into the liquid slag phase such that it penetrates into it to a minimum depth of ¼, preferably to a minimum depth of ⅓, more preferably to a minimum depth of ½, even more preferably to a minimum depth of ⅔, and most preferably to a minimum depth of ¾. By means of specific adjustment of the speed along with the gas flow pulse of the injected reaction gas, the penetration depth is adjustable, such that, if required and depending on the two parameters, penetration into the liquid melt phase can also be achieved. This means that, if necessary, the metal-containing melt phase located below the liquid slag phase can also be manipulated. In addition, the gas jet can briefly rupture cavitations in the liquid slag phase, into which the metal-containing raw materials, waste materials and/or secondary waste materials are then torn and better decomposed within the slag phase.

In an advantageous embodiment, the reaction gas can be blown into the slag phase via the at least one injector at a speed of at least 50 m/s, preferably at a speed of at least 100 m/s, more preferably at a speed of at least 150 m/s, even more preferably at a speed of at least 200 m/s, further preferably at a speed of at least 250 m/s, and most preferably at a speed of at least 300 m/s, wherein the speed values mentioned in the present case are exit speeds that the respective gas has upon exiting the injector, that is, at its tip.

With regard to the maximum speed, it is preferably provided that the reaction gas is injected into the liquid slag phase at a speed of a maximum of 1000 m/s, more preferably at a speed of a maximum of 800 m/s, still more preferably at a speed of a maximum of 600 m/s, further preferably at a speed of a maximum of 550 m/s, and most preferably at a speed of a maximum of 450 m/s.

In this connection, it is particularly preferred that the at least one injector comprises a Laval nozzle via which the reaction gas is blown into the liquid slag phase. A Laval nozzle is characterized by comprising a convergent section and a divergent section, which are adjacent to each other at a nozzle throat. The radius in the narrowest cross-section, the outlet radius along with the nozzle length can be different as a function of the respective design case. Such a Laval nozzle is known from the publication DE 10 2011 002 616 A1, to which reference is made herein and which constitutes part of the disclosure of the present invention.

In a further advantageous embodiment, the Laval nozzle additionally has a coaxial nozzle or an annular gap nozzle, via which a second oxidizing, reducing and/or inert gas and/or gas mixture can be blown onto the slag phase. While by means of the injector, preferably comprising a supersonic capable Laval nozzle, the first oxidizing, reducing and/or inert gas and/or gas mixture is blown into the liquid slag phase in such a manner that it penetrates it, the second oxidizing, reducing and/or inert gas and/or gas mixture is merely blown onto the slag phase via the annular gap nozzle and does not penetrate it. The second oxidizing, reducing and/or inert gas and/or gas mixture is therefore referred to as the "sheath gas" in the context of the present disclosure.

The first and/or second oxidizing gas and/or gas mixture is preferably selected from the series comprising oxygen, air and/or oxygen-enriched air. The first and/or the second reducing gas and/or gas mixture is preferably selected from the series comprising natural gas, in particular methane, carbon monoxide, water vapor, hydrogen, in particular green hydrogen, and/or gas mixtures thereof. The first and/or second inert gas and/or gas mixture is preferably selected from the series comprising nitrogen, argon, carbon dioxide and/or gas mixtures thereof.

In the context of the present disclosure, the term "green hydrogen" is understood to mean that it has been produced electrolytically by splitting water into oxygen and hydrogen, wherein the electricity required for electrolysis comes from renewable sources such as wind, hydropower and/or solar power.

The possibility of introducing, in addition to the reaction gas, a reactive and/or an inert sheath gas and/or a sheath gas mixture into the smelting unit advantageously permits open-loop control of the chemical potential along with closed-loop control of the oxygen partial pressure in the liquid slag phase along with the gas phase. Thereby, the chemical potential of the gas phase is formed by the reaction gas bubbles in the liquid melt and slag phase resulting from the metal-containing raw materials, waste materials and/or secondary waste materials to be melted down, the reaction gas introduced via the injector along with the sheath gas fed.

In a preferred embodiment, the composition of the reaction gas blown into the liquid slag phase can be kept constant, while the composition of the sheath gas can be selectively changed as a function of the requirements for the optimum open-loop control of the chemical potential of the gas atmosphere.

As a supplement and/or alternatively, in a further preferred embodiment, the composition of the sheath gas blown onto the slag phase can be kept constant, while the composition of the reaction gas or reaction gas mixture added to the liquid slag phase can be selectively changed as a function of the requirements for optimum control of the chemical potential.

Preferred flow rates at which the reaction gas is blown into the liquid slag phase are at least 300 $Nm^3/h$, preferably at least 350 $Nm^3/h$, more preferably at least 400 $Nm^3/h$, even more preferably at least 450 $Nm^3/h$ and most preferably at least 500 $Nm^3/h$. Since flow rates are a reference-dependent variable, they can be larger as a function of the unit size.

As explained previously, the arrangement of the at least one injector at a specific angle to the horizontal causes the liquid melt phase to rotate, such that a vortex within both the main and secondary reaction zones is formed. In order to achieve a particularly efficient vortex in the liquid slag phase, also one which has a beneficial effect with respect to the addition of the shredded metal-containing raw materials, waste materials and/or secondary waste materials, it is preferably provided that the reaction gas is blown into the slag phase via the at least one injector tangentially with respect to a notional flow ring, wherein the flow ring comprises a diameter that corresponds to 0.1 to 0.9 times the inner diameter, more preferably 0.1 to 0.8 times the inner diameter, even more preferably 0.2 to 0.7 times the inner diameter, and most preferably 0.2 to 0.6 times the inner diameter of the main reaction zone. Advantageously, it has been shown that, at a specific rotational speed of the liquid slag phase, a liquid spout can be formed in the center of the latter, via which the shredded metal-containing raw materials, waste materials and/or secondary waste materials can be introduced directly into the liquid melt phase and/or can at least be taken up directly by the liquid slag phase and thus decomposed much faster in the process. In contrast to the processes known from the prior art, the decomposition process takes place in the desired main reaction zone or in the liquid slag phase, and not on its surface.

In a particularly advantageous embodiment, it is therefore provided that the metal-containing raw materials, waste materials and/or secondary waste materials are selectively fed into the center of the slag phase through an opening of the smelting unit arranged above the liquid slag phase.

The effect described above is particularly advantageous if the reaction gas is injected into the liquid slag phase via at least two, more preferably via at least three, still more preferably via at least four, and most preferably via at least five injectors arranged in a wall of the smelting unit, wherein the plurality of injectors are particularly preferably arranged at an equal distance along the circumference of the smelting unit.

In addition and/or alternatively, the shredded and/or possibly powdered metal-containing raw materials, waste materials and/or secondary waste materials can be added to the liquid slag phase via at least one, preferably via at least two, more preferably via at least three, injection lance(s) that are arranged in the region of the at least one injector. Via the at least one, advantageously a plurality of, injection lances, the shredded and/or optionally powdered material can be injected directly into the liquid slag phase, more preferably directly into the cavitation generated by the at least one injector within the liquid slag phase, and/or blown directly into the gas jet of the injector, by which the shredded and/or optionally powdered metal-containing raw materials, waste materials and/or secondary waste materials then enter the liquid slag phase. Thus, these may be effectively implemented with minimal losses. A particularly effective conversion is achieved if the material has a mean particle size of 0.01 to 5.0 mm, preferably a mean particle size of less than 3.5 mm, more preferably a mean particle size of less than 3.0 mm.

In another preferred embodiment, the reaction gas injected into the slag phase via the at least one injector can be pulsed.

In principle, the method is provided for pyrometallurgical smelting of metal-containing raw materials, waste materials and/or secondary waste materials. In particular, these are raw materials, waste materials and/or secondary waste materials containing antimony, bismuth, lead, iron, gallium, gold, indium, copper, nickel, palladium, platinum, rhodium, ruthenium, silver, zinc and/or tin, such as in particular organic-containing scrap.

In the context of the present disclosure, organic-containing scrap is understood to be any scrap comprising an organic component. Preferred organic-containing scrap is selected from the series comprising electrical scrap, auto shredder scrap and/or transformer shredder scrap, in particular shredder waste (light fraction).

In the context of the present disclosure, the term "electronic scrap" is understood to mean old electronic equipment as defined in accordance with EU Directive 2002/96/EC.

Categories of equipment covered by this Directive relate to large household appliances; small household appliances; IT and telecommunications equipment; consumer electronics equipment; lighting equipment; electrical and electronic tools (with the exception of large-scale stationary industrial tools); electrical toys and sports and leisure equipment; medical devices (with the exception of all implanted and infected products); monitoring and control instruments; along with automatic dispensers. With regard to the individual products that fall into the corresponding equipment category, reference is made to Annex IB of the Directive.

The invention and the technical environment are explained in more detail below with reference to the figures. It should be noted that the invention is not intended to be limited by the exemplary embodiments shown. In particular, unless explicitly shown otherwise, it is also possible to extract partial aspects of the facts explained in the figures and combine them with other components and findings from the present description and/or figures. In particular, it should be noted that the figures and in particular the size relationships shown are only schematic. Identical reference signs designate identical objects, such that explanations from other figures may be used as a supplement if necessary.

BRIEF DESCRIPTION OF THE DRAWINGS

FIG. 1 shows an embodiment of a smelting unit in a schematic sectional view for carrying out the method for pyrometallurgical smelting.

FIG. 2 shows an illustration of the smelting unit according in accordance with section line A-A.

DETAILED DESCRIPTION

FIG. 1 shows a schematic illustration of an embodiment of the smelting unit 1, which is provided for the pyrometallurgical smelting of metal-containing raw materials, waste materials and/or secondary waste materials, hereinafter referred to as material M to be smelted, in the presence of an oxidizing, reducing and/or inert gas and/or gas mixture G. The oxidizing, reducing and/or inert gas and/or gas mixture G is hereinafter referred to as reaction gas G.

The smelting unit 1 shown here is designed in the form of a conventional bath smelting unit, which comprises a base surface 2 in the lower region along with a substantially cylindrical reactor wall 3 extending vertically from the base surface 2 and having a first conical region 4 and a second conical region 5. The smelting unit 1 comprises a smelting zone 6, a main reaction zone and a secondary reaction zone 7, 8.

The first conical region 4 of the smelting unit 1 is configured such that it comprises the smelting zone 6 along with the main reaction zone 7. The secondary reaction zone 8 extends above the main reaction zone 7.

In the first conical region 4, the shredded material M to be smelted is smelted in the presence of the reaction gas G, such that a liquid melt phase 9 and a liquid slag phase 10 are formed.

As can be seen from the illustration in FIG. 1, the reaction gas G is injected into the smelting unit 1 via injectors 11 arranged in the reactor wall 3. The injectors 11 are arranged between the first conical region 4 along with the second conical region 5 in a ring element 12, which comprises specifically designed and water-cooled ports 13, in which the injectors 11 are correspondingly positioned.

In the embodiment shown here, the reaction gas G is injected into the slag phase 10 via the injectors 11 arranged in the smelting unit 1 above the liquid slag phase or in the secondary reaction zone 8. As can be seen based on the illustration, the injectors 11 are oriented at a specific angle and are arranged above the liquid slag phase 10. For example, the angle can be in the range of 5° to 85° with respect to the horizontal H.

Each of the injectors 11 has a respective Laval nozzle 14 through which the reaction gas G can be injected into the slag phase 10 at supersonic speed. Furthermore, the reaction gas G is fed in compressed form into the smelting unit 1 via the injectors 11, which preferably each comprise a Laval nozzle 14, and is adiabatically expanded within the smelting unit 1 and then injected into the liquid slag phase 10 as adiabatically expanded reaction gas, particularly preferably in such a manner that a quantity of heat adapted to the process can be extracted in a highly exothermically proceeding reaction process.

On the outside, each of the injectors 11 further comprises a coaxial nozzle 15 through which a sheath gas (not shown) can be blown onto the liquid slag phase 10.

FIG. 2 shows an illustration of the smelting unit 1 in accordance with section line A-A. What can be particularly seen here are the three injectors 11 arranged at equal distances from one another, via which the reaction gas G is blown tangentially into the liquid slag phase 10 with respect to a notional flow ring 16, wherein the flow ring 16 can comprise a diameter that corresponds to 0.1 to 0.9 times the inner diameter of the main reaction zone 7.

The material M to be smelted can be fed into the center of the slag phase 10 through an opening 17 of the smelting unit 1 arranged above the slag phase 10. In addition or alternatively, this can also be added to the liquid slag phase 10 via an injection lance 18 arranged in the region of the injector 11.

LIST OF REFERENCE SIGNS

1 Smelting unit
2 Base surface
3 Reactor wall
4 First conical region
5 Second conical region
6 Melting zone
7 Main reaction zone
8 Secondary reaction zone
9 Melt phase
10 Slag phase
11 Injector
12 Ring element
13 Port
14 Laval nozzle
15 Coaxial nozzle
16 Notional flow ring
17 Opening/feeding system
18 Injection lance
M Material to be smelted
H Horizontal
G Reaction gas

The invention claimed is:
1. A method for pyrometallurgical smelting, comprising:
feeding metal-containing raw material, waste material, and/or secondary waste material (M) in shredded form to a smelting unit (1) which comprises
a smelting zone (6),
a main reaction zone (7), and
a secondary reaction zone (8); and smelting the material (M) in presence of an oxidizing, reducing and/or inert gas and/or gas mixture (G), and thereby forming
a liquid melt phase (9),
a liquid slag phase (10), and
a gas phase,
wherein the oxidizing, reducing and/or inert gas and/or gas mixture (G)
has a positive Joule-Thompson coefficient ($\mu$), and
is fed in compressed form via at least one injector (11), and
is adiabatically expanded within the smelting unit (1) and is then
injected as adiabatically expanded gas and/or gas mixture into the liquid slag phase (10) in such a manner that a cooling effect of at least 10 J/Nm$^3$ and at most 100 KJ/Nm$^3$ is achieved.

2. The method according to claim 1, wherein the at least one injector (11) comprises
a Laval nozzle (14) via which the oxidizing, reducing and/or inert gas and/or gas mixture (G) is blown into the liquid slag phase (10), and
a coaxial nozzle (15) via which a second oxidizing, reducing and/or inert gas and/or gas mixture (G) is blown onto the liquid slag phase (10).

3. The method according to claim 1,
wherein the at least one injector (11)
is arranged in the smelting unit (1) above the liquid slag phase (10),
does not contact the liquid slag phase (10), and
is oriented at an angle of 5 to 85° with respect to a horizontal.

4. The method according to claim 3,
wherein the at least one injector (11), via which the oxidizing, reducing and/or inert gas and/or gas mixture (G) is blown into the liquid slag phase (10) without contact, has a minimum distance of 0.30 m from a surface of the liquid slag phase (10).

5. The method according to claim 1,
wherein the oxidizing, reducing and/or inert gas and/or gas mixture (G) is
an oxidizing gas and/or gas mixture (G) selected from the group consisting of oxygen, air and/or oxygen-enriched air;
a reducing gas and/or gas mixture selected from the group consisting of natural gas, methane, carbon monoxide, water vapor, hydrogen, and gas mixtures thereof; and/or
an inert gas and/or gas mixture is selected from the group consisting of nitrogen, argon, carbon dioxide and gas mixtures thereof.

6. The method according to claim 1,
wherein the oxidizing, reducing and/or inert gas and/or gas mixture (G) blown into the liquid slag phase (10) via the at least one injector (11) at a speed of at least 300 m/s.

7. The method according to claim 1,
wherein the oxidizing, reducing and/or inert gas and/or gas mixture (G) is blown into the liquid slag phase (10) at a flow rate of at least 500 Nm$^3$/h.

8. The method according to claim 1,
wherein the oxidizing, reducing and/or inert gas and/or gas mixture (G) is blown into the liquid slag phase (10) via the at least one injector (11) tangentially with respect to a notional flow ring (16),
wherein the notional flow ring (16) comprises a diameter that corresponds to 0.1 to 0.9 times an inner diameter of the main reaction zone (7) of the smelting unit (1).

9. The method according to claim 1,
wherein the oxidizing, reducing and/or inert gas and/or gas mixture (G) blown into the liquid slag phase (10) via the at least one injector (11) is pulsed.

10. The method according to claim 1,
wherein the metal-containing raw material, waste material and/or secondary waste material is fed into a center of the liquid slag phase (10) through an opening (17) arranged above the liquid slag phase (10).

11. The method according to claim 1,
wherein the metal-containing raw material, waste material and/or secondary waste material is blown into the liquid slag phase (10) through at least one injection lance (18) arranged in a wall (3) of the smelting unit (1).

12. The method according to claim 11,
wherein the at least one injection lance (18) is arranged in a region of the at least one injector (11).

* * * * *